United States Patent
Henegar

(10) Patent No.: US 6,610,159 B2
(45) Date of Patent: Aug. 26, 2003

(54) OBSTRUCTION AVOIDANCE CONTINUOUS SEAM WELDING SYSTEM

(75) Inventor: Jeffrey W. Henegar, Carmel, IN (US)

(73) Assignee: BFS Diversified Products, LLC, Carmel, IN (US)

( * ) Notice: Subject to any disclaimer, the term of this patent is extended or adjusted under 35 U.S.C. 154(b) by 44 days.

(21) Appl. No.: 09/916,988

(22) Filed: Jul. 27, 2001

(65) Prior Publication Data

US 2003/0019586 A1 Jan. 30, 2003

(51) Int. Cl.$^7$ ............................................... B32B 35/00
(52) U.S. Cl. .................... 156/82; 156/391; 156/497; 156/499; 156/544; 156/574; 156/579
(58) Field of Search .................. 156/82, 391, 497, 156/499, 544, 553, 574, 579

(56) References Cited

U.S. PATENT DOCUMENTS

| | | | |
|---|---|---|---|
| 4,087,309 A | 5/1978 | Lang | 156/497 |
| 4,239,581 A | 12/1980 | Lang | 156/82 |
| 4,440,588 A | 4/1984 | Stevenson et al. | 156/157 |
| 4,447,288 A | 5/1984 | Seaman | 156/574 |
| D294,362 S | 2/1988 | Sinclair | D15/144 |
| 4,737,212 A | 4/1988 | Emrich et al. | 156/157 |
| 4,737,213 A | 4/1988 | Paeglis et al. | 156/157 |
| 4,744,855 A | 5/1988 | Ellenberger et al. | 156/499 |
| 4,834,828 A | 5/1989 | Murphy | 156/359 |
| 4,855,004 A | 8/1989 | Chitjian | 156/359 |
| 4,861,400 A | 8/1989 | Sargent | 156/71 |
| 4,861,412 A | 8/1989 | Meister | 156/499 |
| 4,872,941 A | 10/1989 | Lippman et al. | 156/497 |
| 5,110,398 A | 5/1992 | Murphy | 156/499 |
| 5,234,533 A | 8/1993 | Neal | 156/497 |
| 5,353,782 A | 10/1994 | Morris | 126/271.2 |
| 5,399,226 A | 3/1995 | Chapman | 156/408 |
| 5,569,352 A | 10/1996 | Johansen et al. | 156/499 |
| 5,624,511 A | 4/1997 | Lippman | 156/64 |
| 5,776,299 A | 7/1998 | Morris | 156/497 |
| 5,816,019 A | 10/1998 | Saget et al. | 53/373.9 |
| 5,865,942 A | 2/1999 | Sinclair | 156/499 |
| 5,935,357 A | 8/1999 | Hubbard et al. | 156/82 |
| 6,004,645 A | 12/1999 | Hubbard | 428/57 |
| 6,050,317 A | 4/2000 | Weissfloch | 156/499 |
| 6,055,786 A | 5/2000 | Hubbard et al. | 52/409 |
| 6,149,762 A | 11/2000 | Kobzan | 156/497 |
| 6,186,210 B1 | 2/2001 | Gehde | 156/499 |
| 6,187,122 B1 | 2/2001 | Hubbard et al. | 156/82 |
| 6,213,184 B1 | 4/2001 | Sinclair | 156/499 |
| 6,238,502 B1 | 5/2001 | Hubbard | 156/71 |
| 6,325,126 B1 | 12/2001 | Rubenacker et al. | 156/497 |
| 6,536,498 B1 | 3/2003 | Srinivasan et al. | 156/497 |

Primary Examiner—James Sells
(74) Attorney, Agent, or Firm—Michael R. Huber; Andrew B. Morton

(57) ABSTRACT

An apparatus for seaming roofing membranes to one another, wherein one of the membranes is secured to an underlying support structure by at least one protruding fastener, the apparatus including a wheeled carriage having an upwardly extending push/pull bar, a power supply carried by the carriage, the power supply driving the wheeled carriage, a heating assembly carried by the carriage and powered by the power supply, the heating assembly including a fan and a heating element, wherein the fan blows ambient air over the heating element and generate a heated airflow sufficient to fuse the roofing membranes to one another, a nozzle coupled to the heating assembly for directing the heated airflow between the two membranes, the nozzle having a pair of outer channels and an elevated center channel disposed between the pair of outer channels, the elevated channel passing over the at least one protruding fastener, and a variable pressure roller assembly coupled to the carriage, the roller assembly having a pair of outer rollers and a spring-biased center roller disposed between the pair of outer rollers, the spring-biased roller aligned with the elevated channel and passing over the at least one protruding fastener so as to form a substantially continuous width seam except where interrupted by the protruding fastener.

16 Claims, 4 Drawing Sheets

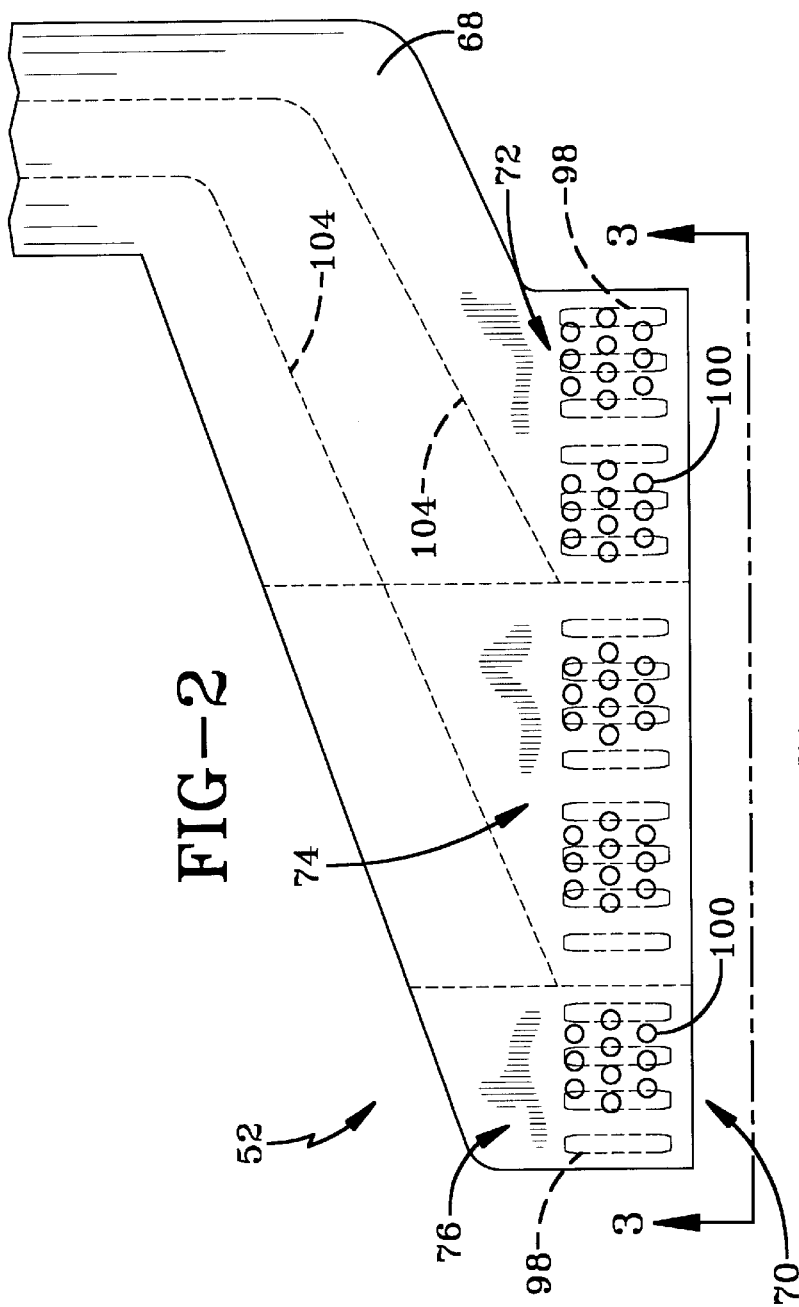
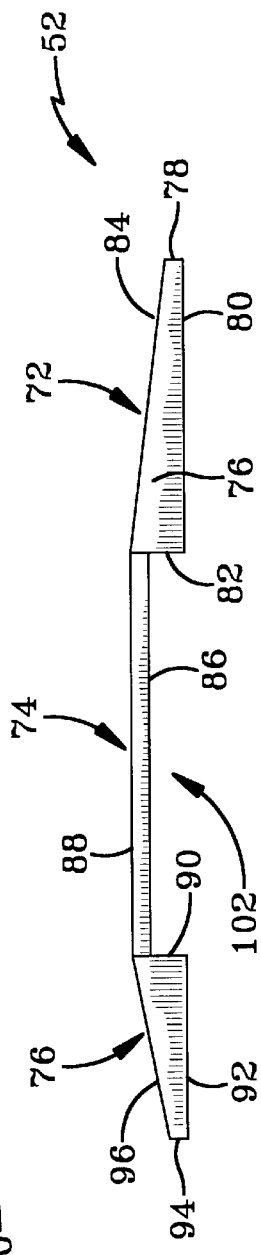

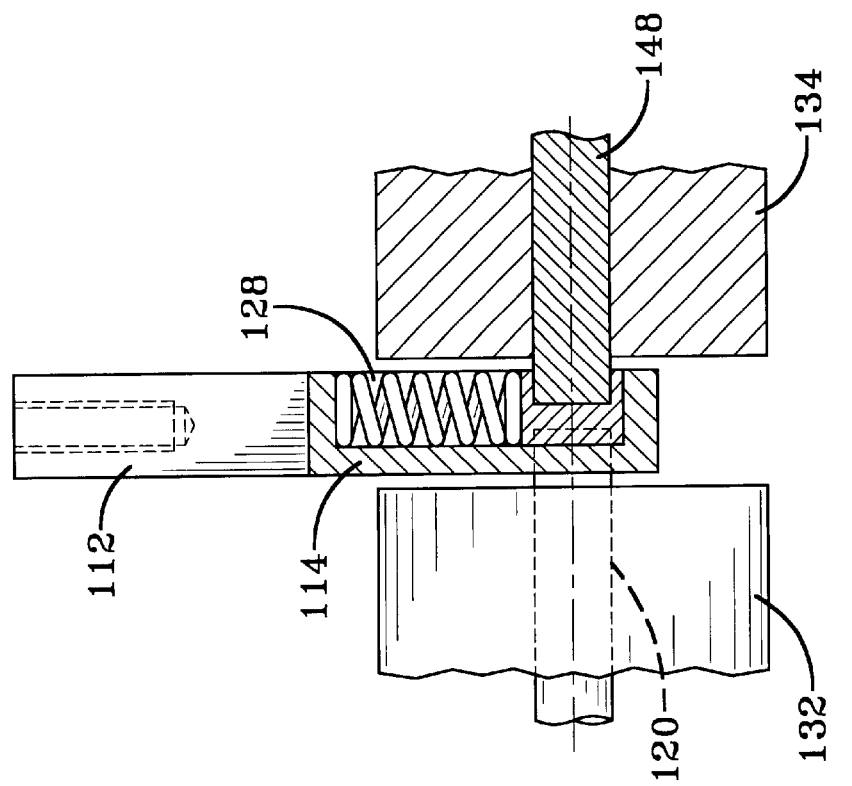
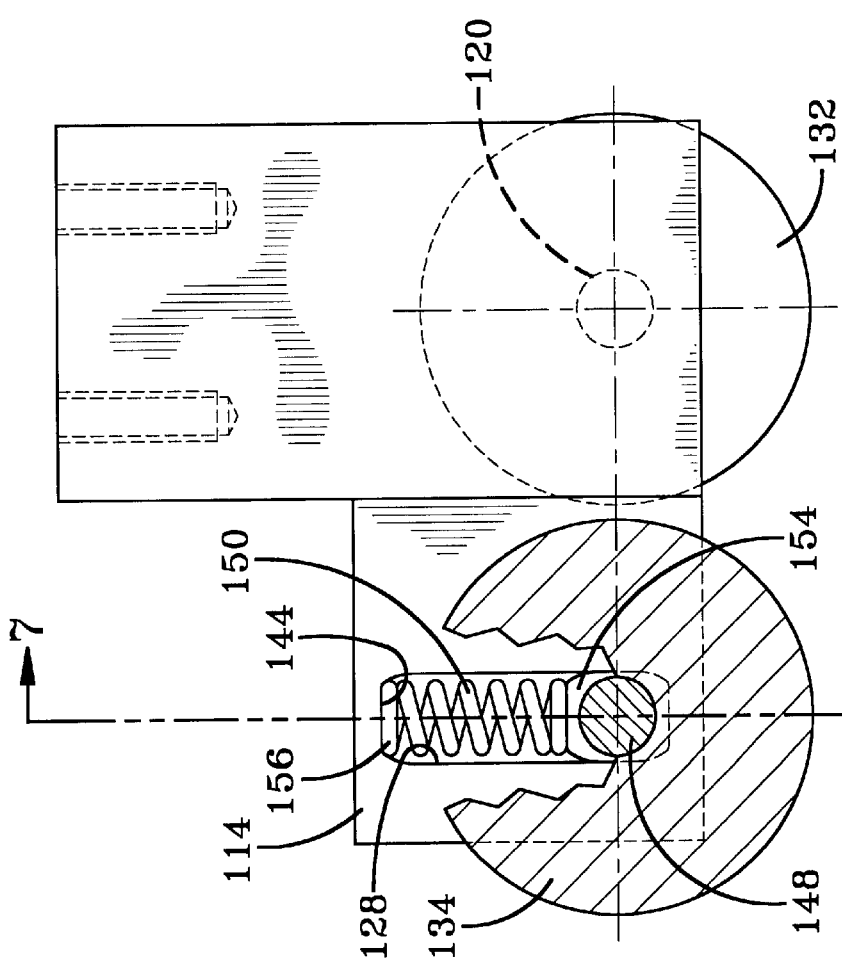

US 6,610,159 B2

OBSTRUCTION AVOIDANCE CONTINUOUS SEAM WELDING SYSTEM

FIELD OF THE INVENTION

This invention relates generally to roof membrane seam welders. More particularly, it relates to a seam welder that avoids fastening obstructions and provides a continuous seam weld when obstructions are not present.

BACKGROUND OF THE INVENTION

When installing a roof, roof membranes are applied over the base structure. Roof membranes, which are made of thermoplastic-based materials such as polyvinyl chloride (PVC), thermoplastic polyolefin (TPO), or thermoplastic poly vulcanites (TPV), repel water, snow, and generally protect the integrity of the underlying structure.

To properly install roof membranes, a fastening device such as a plate, batten bar, or other type of mechanical affixment secures one edge of a membrane to the underlying structure. An edge of a second membrane is then placed over the first membrane and the fastening device. The membranes are then welded to one another by applying a solvent/adhesive and/or by applying heat. The welding process is complicated by the presence of the fastener along the edge of the bottom membrane. As such, it is difficult to obtain a uniform and continuous seam/weld between the adjoining membranes.

One attempt at avoiding obstructions and fasteners is disclosed in U.S. Pat. No. 4,834,828, in which a bifurcated heat element seams the membranes while avoiding the fastening device. Although effective, the disclosed seaming device is deficient inasmuch as some fastening devices do not extend along the entire edge of the membrane and a gap or bubble may form along the welded seam. Accordingly, a secure seal is not obtained by virtue of elements infecting the gap between the seams and allows the membranes to be subjected to uplift pressures and other natural elements. This deteriorates the integrity of the seam which ultimately damages the underlying structure.

A continuous welding machine that can accommodate fastening devices when encountered and provide a continuous weld when obstructions are not present remains an unmet need in the art.

SUMMARY OF THE INVENTION

Briefly, the present invention provides an apparatus for seam welding membranes that avoid obstructions when encountered and also provides a continuous width weld when obstructions are not present.

In an apparatus for seam welding membranes that avoids obstructions, there is a wheeled carriage, which may be driven by a motor, that is typically pulled during operation. The apparatus heats both membranes in the area where they are to be seamed to one another. Once a fusing temperature has been reached, a weighted roller assembly applies pressure to the membranes to complete the bonding process.

In order to obtain a continuous seam weld when obstructions are not present and to avoid obstructions when encountered, a specially designed nozzle and roller assembly are used. A heating assembly is mounted on the carriage and exhausts heated air between the two membranes. The heating assembly includes a nozzle which is configured with a plurality of channels, wherein the outer channels are in close association with the bottom and top membranes while the center channel is somewhat elevated above the bottom membrane and in close association with the top membrane. The elevated nature of the central channel allows for the nozzle to avoid any obstructions that are positioned in about the center portion of the seam area. The carriage moves at a relatively low rate of speed so that the heated air can elevate the surface temperature of the membranes to about their melting temperature. Immediately following the nozzle, a roller assembly exerts a uniform pressure upon the two membranes to ensure their bonding to one another. In order to avoid obstructions, the pressure roller assembly incorporates a plurality of rollers. In particular, the roller assembly includes two outer rollers which continually exert a pressure force upon the heated membranes. A center spring-biased pressure roller is disposed between the two outer rollers and, likewise, exerts a uniform pressure upon the membranes in the absence of an obstruction. When an obstruction is encountered, the spring-biased roller assembly is deflected upwardly and then returns after the obstruction has been passed. Accordingly, a substantially continuous width seam is formed between the membranes except where interrupted by a protruding fastener.

The present invention provides an improved method for fusing two membranes to one another while also improving the integrity of the seam therebetween.

BRIEF DESCRIPTION OF THE DRAWINGS

For a more complete understanding of the invention, reference can be made to the following detailed description and accompanying drawings.

FIG. 2 is a plan view of a nozzle;

FIG. 3 is a top view of the nozzle;

FIG. 6 is a sectional view of a pressure roller assembly taken substantially along line 6—6 of FIG. 4; and FIG. 7 is a sectional view of an arm of the pressure roller assembly taken substantially along line 7—7 of FIG. 6.

DETAILED DESCRIPTION OF ILLUSTRATIVE EMBODIMENTS

Figure 1:
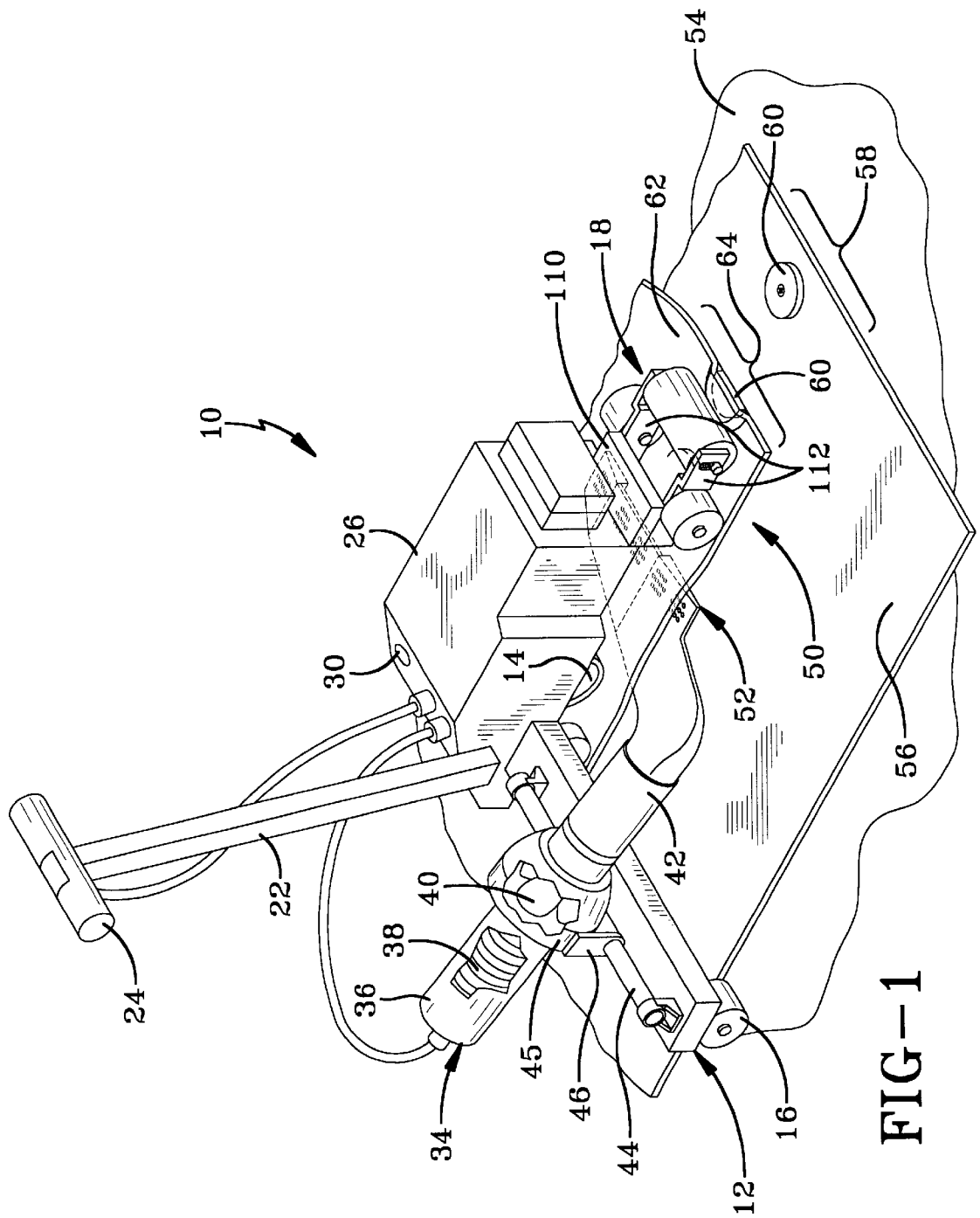
FIG. 1 is a schematic perspective illustration of a continuous seam welder according to the present invention.
Figure 4:
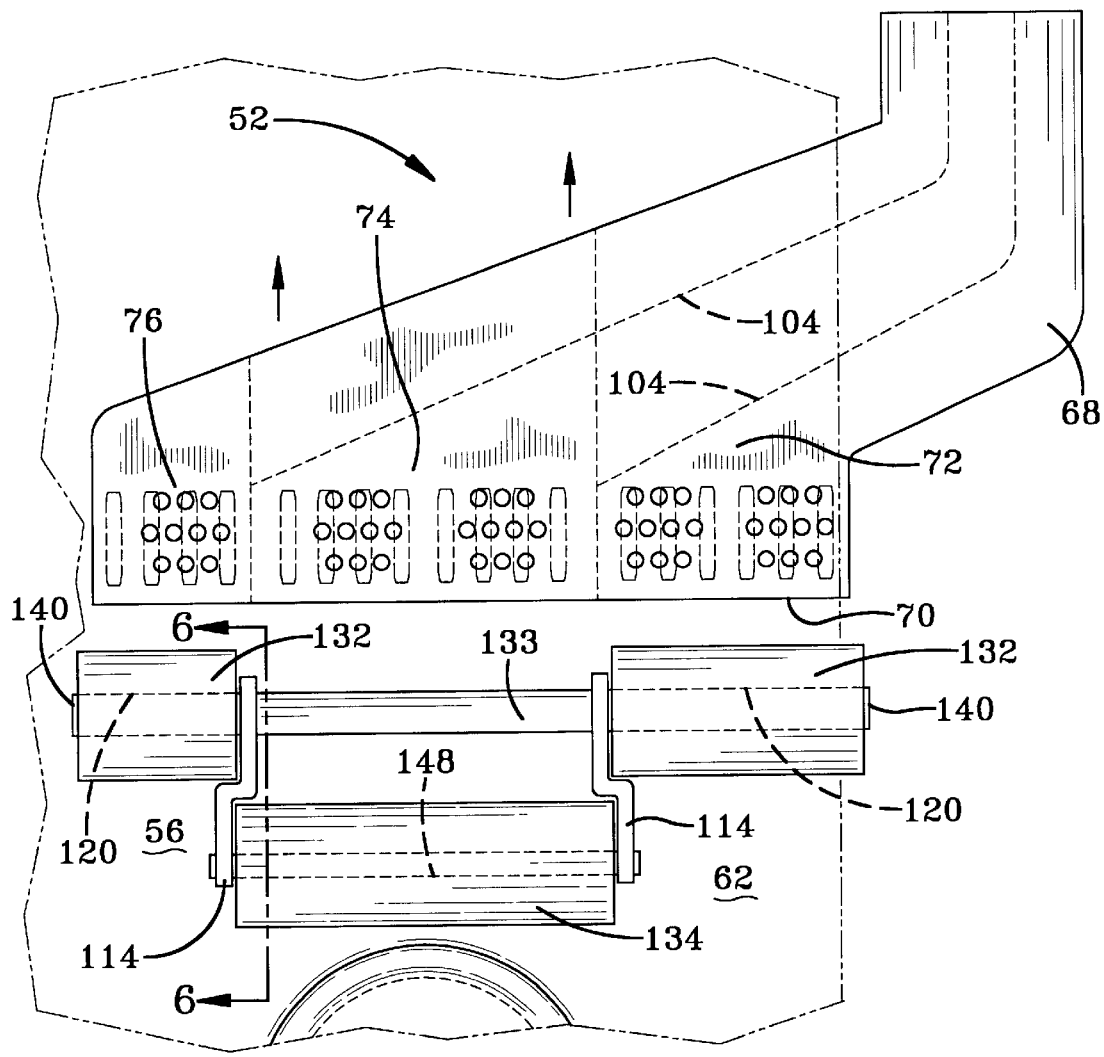
FIG. 4 is a plan view of a pressure roller assembly.
Figure 5:
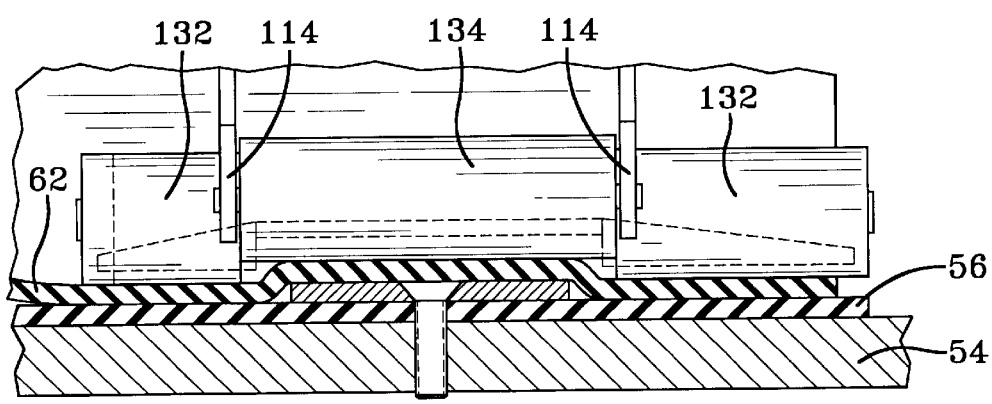
FIG. 5 is an elevational view of the nozzle and the pressure roller assembly.

Referring now to FIG. 1, an apparatus for an obstruction avoidance continuous seam welding system is designated generally by the numeral 10. The apparatus 10 includes a carriage 12 which is supported and moveable upon a drive wheel assembly 14. Typically, the drive wheel assembly is located on the side of the carriage 12 in the direction in which the carriage is intended to move. Other wheels 16 may be positioned upon the carriage to rotatably support it during operation. Positioned at the other end of the carriage 12 is a pressure roller assembly designated generally by the numeral 18. The pressure roller assembly facilitates movement of the carriage and its full function will be described in detail hereinbelow. A shaft 22 is fixedly mounted to the carriage 12 and extends upwardly therefrom. A cross-bar 24 extends perpendicularly from the shaft and may be employed by an operator to push or pull the carriage.

The carriage 12 carries a power supply 26 which may be an electric motor or the like for providing power to the apparatus 10. It will be appreciated that the power supply may be battery-powered or it may be a device that receives electrical power from a generator or utility service. The power supply 26 is used to power the drive wheel assembly 14 and propel the carriage 12. A plurality of controls 30 are carried by the carriage 12 and associated with the power supply 26 to regulate the power generated thereby. The controls 30 function to adjust the power and support other features of the apparatus 10.

The heating assembly 34, which is associated with the power supply 26 and the controls 30, is supported by the carriage 12. The heating assembly includes a housing 36 in which heat elements 38 are contained. A fan 40 is carried in the housing 36 and, when energized, forces ambient air across or through the heat elements 38 in a manner well known in the art. The heated ambient air is then directed through a heat duct 42. A lateral pin 44 is mounted to the carriage 12 and carries the heating assembly 34. In particular, the assembly is received in a mounting collar 45 from which extends a pair of arms 46 that slide and pivot upon the pin 44. This allows the assembly to be easily inserted and withdrawn from a position to seam the membranes to one another.

It can be seen that a seaming assembly, designated generally by the numeral 50, is carried by the carriage 12. The seaming assembly includes the roller assembly 18 and a nozzle 52. The membranes are supported by an underlying support structure 54. In practice, a bottom membrane 56 is placed over the support structure 54 and may be at least temporarily held in place by an adhesive or the like. The bottom membrane 56 includes an edge 58 that is to be seamed. The edge 58, as defined herein, may include an area somewhat removed from the literal edge of the membrane 56. In order to positively secure the bottom membrane 56 to the support structure 54, a fastener 60 is employed. The fastener 60 may be a round disc with a screw therethrough, a batten bar, or other fastening device which has a protruding member extending above the surface of the bottom membrane 56. Disposed over the bottom membrane 56 is a top membrane 62 which has an edge 64. The edge 64 may be an area which is somewhat removed from the literal edge of the top membrane 62.

As best seen in FIGS. 1–4, the nozzle 52 directs heated air from the heat duct 42 between the top surface of the bottom membrane 56 and the underlying surface of the top membrane 62. The nozzle 52 includes an elbow 68 which redirects the flow of heated air in such a way that the heat is applied to the desired surfaces without dislodging the membrane's positioning upon the underlying structure. The elbow 68 may be oriented to the left or the right as dictated by the end use. The nozzle 52 may be provided with an end section 70 that is either opened or closed. The nozzle includes a plurality of channels and, in particular, a proximal channel 72 which is closest to the elbow 68. A center channel 74 is adjacent the proximal channel 72 and a distal channel 76 is furthest from the elbow 68. The channels 72, 74, and 76 may be provided with different sizes or shapes as required. The proximal channel 72 includes a side 78 that is substantially perpendicular with a bottom plate 80 that is positioned adjacent the top surface of the bottom membrane 56. Extending substantially perpendicularly upward from the bottom plate 80 is an inner side 82 which is substantially parallel with the outer side 78. Connecting the top edges of the sides 78 and 82 is a top angle plate 84 which tapers downwardly from the inner side 82 to the outer side 78.

The center channel 74 includes an elevated bottom plate 86 which extends from the inner side 82. The center channel 74 also includes an elevated top plate 88 which is substantially parallel with the bottom plate 86 and also extends from the inner side 82.

The distal channel 76 includes an inner side 90 that is substantially perpendicular to the bottom plate 86 and the top plate 88. The distal channel includes a bottom plate 92 which, in operation, is positioned upon the upper surface of the bottom membrane 56. Extending substantially perpendicularly upward from the bottom plate 92 is an outer side 94. Extending between the top edges of the inner side 90 and the outer side 94 is a top angle plate 96. The top angle plate tapers upwardly from the outer side 94 to the inner side 90.

The plurality of channels and their respective top plates 84, 88, and 96 form a relatively smooth and continuous top surface of the nozzle 52. The tapered features of the top plates 84 and 96 facilitate the insertion and withdrawal of the nozzle 52 between the membranes 56 and 62. Each of the bottom plates 80, 86, and 92 are provided with a plurality of slots 98. The top plates 84, 88, and 96 are provided with a plurality of vent holes 100. Accordingly, the heated air is directed through these slots 98 and holes 100 onto the surfaces of the membranes to be fused.

The configuration of the nozzle is such that the inner sides 82 and 90 and the elevated bottom plate 86 form a clearance gap 102. The amount of elevation between the bottom plates 80, 92, and the elevated bottom plate 86 is determined by the height of the protruding fasteners used to attach the bottom membrane to the underlying support structure.

Extending from the inner sides 82 and 90 are vanes 104 which are internal to the nozzle 52. The vanes extend from the inner sides and are proportionally positioned within the nozzle and heat duct so as to direct the heated airflow equally along the entire width of the nozzle 52. This provides a uniform heat gradient so as to ensure uniform bonding between the membranes in the seaming area.

The pressure roller assembly 18, which is part of the seaming assembly 50 and is best seen in FIGS. 1 and 4–7, is carried by the carriage 12 and, in particular, by a frame 110 attached to the carriage. The assembly 18 and the nozzle 52 may be attached to existing seam welders with slight modifications or may be part of an originally manufactured welder. In any event, the frame 110 includes a pair of exterior arms 112 which extend downwardly therefrom. Extending from the arms 112 are a pair of follower arms 114. Each of the exterior arms may provide aligned shaft holes 120 that extend completely therethrough. The follower arms 114 provide a slide recess 128 that face one another.

An exterior roller 132 extends from each of the exterior arms 112 and is carried by a shaft 133. Depending upon the particular type of seam desired, the width of the rollers 132 may be adjusted. Between the follower arms 114 is a center roller 134 which is biasingly adjusted, depending upon the contour of the fasteners used to secure the bottom membrane. The size of the roller 134 is selected to be wide enough to accommodate the width of the fastener. Circular disc fasteners are typically about 2½" in diameter, although other sizes could be used. The exterior rollers 132 are preferably closest the end section 70, although the positioning could be reversed. A cap 140 functions to maintain the rotatable roller 132 on the shaft 133 as shown. Bearings or the like may be employed to improve the rotational properties of the rollers.

The slide recess 128 includes a flat portion 144 at a top edge thereof. A center shaft 148 is received in the opposed slide recesses 128 and is biased by a spring mechanism 150. In other words, each end of the center shaft 148 has a spring disposed between a portion of the center shaft and the flat 144. A spring mechanism 150 includes a spring 152 which has at each end a connection device 154, 156 so as to ensure that the spring mechanism 150 is retained within the respective slide recess 128.

In operation, when the carriage is moved either by manual force or by the motorized wheel assembly, heated air is directed through the nozzle and the respective channels to heat the surfaces of the membranes. The rate of speed of the carriage is controlled so that the membranes reach the appropriate bonding temperature. As the nozzle 52 passes over an obstruction, the gap 102 clears the fastener and the center spring-biased roller assembly 134 is pushed upwardly by the protruding fastener 60 and top membrane 62 while the exterior rollers seam the membranes 56, 62 at the sides adjacent the fastener. After the carriage passes over the obstruction, the spring-biased center roller returns to its normal position level with the exterior rollers. Accordingly, a continuous width seam is obtained when an obstruction is not encountered. This device may be used when obstructions are not encountered at all, in instances where a protruding fastener runs along the entire length of the membrane or in just selected portions of the edge of the membrane. The width of the center roller overlaps at least portions of the exterior rollers to provide the continuous seam. Add the width of the channel 72 and the roller 132 are preferably sized to have a larger proportional width at the very edge of the top membrane. This wider seam portion is desired to enhance the bond between the two membranes in an area that is subjected to up-lift pressures and direct exposure to the elements. Of course, sizing of the rollers and corresponding channels may be adjusted according to the particular application. In particular, the inner arms 114 include arm extensions 162 that extend outwardly therefrom. This ensures that there are no gaps between the rollers and that a uniform seal is obtained between the edge of the bottom membrane and the corresponding or facing edge of the top membrane.

The advantages of the foregoing embodiments are readily apparent. It will be appreciated that the fastening devices used to hold the bottom membrane are accommodated, but that a continuous width seam may be obtained where obstructions are not present. This ensures that the bubbling or gaps are avoided and, thus, the integrity of the seal is enhanced. Accordingly, the seaming assembly 50 is a specially designed heat welding nozzle and roller assembly system for use in fusing seam areas containing mechanical fasteners and/or obstructions to create a continuous watertight membrane with either thermoplastic and/or thermoplastic vulcanite membranes. Accordingly, a wider continuous seam than any welding system commercially available for roofing applications is provided. The system is advantageous inasmuch as it provides the ability to create a wider weld providing enhanced performance of the roof system in the presence of uplift pressures, such as wind, freezing and thawing, and other natural environments. The nozzle has the ability to avoid obstructions contained within the seam construction providing fluid operation and uninterrupted welding of the seam. The center pressure roller has the ability to move vertically overcoming obstructions without disrupting balance and/or the performance of the welding operation. It will be further appreciated that the roller assembly and/or the nozzle assembly made the used separately and apart from one another to form a seam. Although it would be preferred that both elements be used together to provide the preferred seam. It will be further appreciated that the configuration of the nozzle may be adjusted according to the particular fastening devices used or to obtain the width of the seam desired.

In order to demonstrate the practice of the present invention, the following examples have been prepared and tested. The examples should not, however, be viewed as limiting the scope of the invention. The claims will serve to define the invention.

What is claimed is:

1. An apparatus for seaming roofing membranes, wherein one of the membranes is secured to an underlying support structure by at least one protruding fastener, the apparatus comprising:

a carriage;

a heating assembly carried by said carriage, said heating assembly generating heat capable of bonding the membranes to one another; and a seaming assembly carried by said carriage, said seaming assembly directing the generated heat to the membranes while also applying pressure to the membranes so as to form a substantially continuous width seam except where interrupted by the protruding fastener, wherein said seaming assembly comprises
   a variable pressure assembly for applying pressure to the heated membranes, said variable pressure assembly having at least one constant pressure source and at least one variable pressure source, said variable pressure source positioned to pass over the at least one protruding fastener.

2. The apparatus according to claim 1, wherein said seaming assembly comprises:

a nozzle for directing heated air between the membranes, said nozzle having at least two channels, wherein one of said channels is slightly elevated so as to form a gap sized to pass over the at least one protruding fastener.

3. The apparatus according to claim 2, wherein said heating assembly further comprises:

a duct for directing the heated air from said heating assembly;

an elbow for transferring the heated air from said duct to said nozzle; and each said channel having a top plate opposed by a bottom plate connected to one another by side walls, one of said bottom plates being slightly elevated with respect to the other bottom plate.

4. The apparatus according to claim 2, wherein said nozzle has three channels, comprising:

two outer channels each having a bottom plate and a tapered top plate connected to each other by at least one side wall; and a center channel disposed between said two outer channels, said center channel having a center top plate connected to said tapered top plates and center bottom plate connected to said outer channel bottom plates, said center bottom plate forming a clearance gap that passes over any protruding fastener.

5. The apparatus according to claim 4, wherein said bottom plates have slots and said top plates have vent holes therethrough.

6. The apparatus according to claim 1, wherein said variable pressure assembly further comprises:

a frame coupled to said carriage;

at least one constant pressure roller carried by said frame; and at least one spring-biased pressure roller carried by said frame, wherein said spring-biased pressure roller accommodates any protruding fasteners when encountered, but otherwise applies a substantially equivalent amount of pressure as said at least one constant pressure roller.

7. The apparatus according to claim 6, wherein said at least one spring-biased pressure roller is disposed between two constant pressure rollers.

8. The apparatus according to claim 1, wherein said seaming assembly comprises:

a nozzle for directing heated air between the membranes, said nozzle having at least two channels, wherein one of said channels is slightly elevated so as to form a gap sized to pass over the at least one protruding fastener.

9. The apparatus according to claim 8, further comprises:

a plurality of wheels journaled to said carriage; and a motor carried by said carriage, said motors rotating at least some of said wheels.

10. An apparatus for seaming roofing membranes to one another, wherein one of the membranes is secured to an underlying support structure by at least one protruding fastener, the apparatus comprising:

a wheeled carriage having an upwardly extending push/pull bar;

a power supply carried by said carriage, said power supply driving said wheeled carriage;

a heating assembly carried by said carriage and powered by said power supply, said heating assembly including a fan and a heating element, wherein said fan blows ambient air over said heating element and generate a heated airflow sufficient to fuse the roofing membranes to one another;

a nozzle coupled to said heating assembly for directing the heated airflow between the two membranes, said nozzle having a pair of outer channels and an elevated center channel disposed between said pair of outer channels, said elevated channel passing over the at least one protruding fastener; and a variable pressure roller assembly coupled to said carriage, said roller assembly having a pair of outer rollers and a spring-biased center roller disposed between said pair of outer rollers, said spring-biased roller aligned with said elevated channel and passing over the at least one protruding fastener so as to form a substantially continuous width seam except where interrupted by the protruding fastener.

11. The apparatus according to claim 10, wherein spring-biased roller is offset from said pair of outer rollers, such that the width of said spring-biased roller overlaps at least a portion of the width of each said outer roller.

12. A nozzle for use with an apparatus that seams two membranes to one another, the apparatus carrying a heating assembly that generates forced heated air, the nozzle comprising:

a duct having one end coupled to the heating assembly; and a plurality of channels connected to an opposite end of said duct, said plurality of channels including a pair of outer channels with an elevated channel therebetween, said elevated channel sized to pass over fastening devices that secure one of the membranes.

13. A variable pressure roller assembly for use with an apparatus that seams two membranes to one another, the apparatus carrying a heating assembly that generates forced heated air, between the membranes, the assembly comprising:

a frame coupled to the apparatus;

at least one constant pressure roller carried by said frame; and at least one spring-biased pressure roller carried by said frame, wherein said spring-biased pressure roller accommodates any protruding fasteners when encountered, but otherwise applies a substantially equivalent amount of pressure as said at least one constant pressure roller, said rollers applying pressure to the membranes to create a bond therebetween.

14. A method for full-width seaming roofing membranes to one another comprising:

placing a first roofing membrane having a lateral edge on a roof structure;

securing said lateral edge to said roof structure with at least one protruding fastener that extends above said lateral edge;

placing a second roofing membrane on the roof structure and on at least said lateral edge to cover said at least one protruding fastener;

positioning an apparatus proximally said lateral edge, said apparatus having a heating assembly and a seaming assembly;

heating said first and second roofing membranes to a predetermined temperature with said heating assembly;

moving said seaming assembly to apply pressure to said first and second membranes to form a substantially continuous width seam between said first and second roofing membranes except where interrupted by the protruding fastener;

providing said seaming assembly with a plurality of rollers: and biasing one of said plurality of rollers, said biased roller passing over said protruding fastener during said moving step.

15. The method according to claim 14, further comprising:

providing said heating assembly with a nozzle;

inserting said nozzle between said lateral edge and said second roofing membrane, said nozzle having a gap sized to pass over said protruding fastener during said moving step.

16. The method according to claim 14, wherein said moving step comprises:

applying a uniform pressure to said membranes with all of said plurality of rollers.

* * * * *